C. E. JOHANSSON.
MEASURING SET.
APPLICATION FILED NOV. 19, 1919.
1,435,525.
Patented Nov. 14, 1922.
2 SHEETS—SHEET 1.
Fig. I.
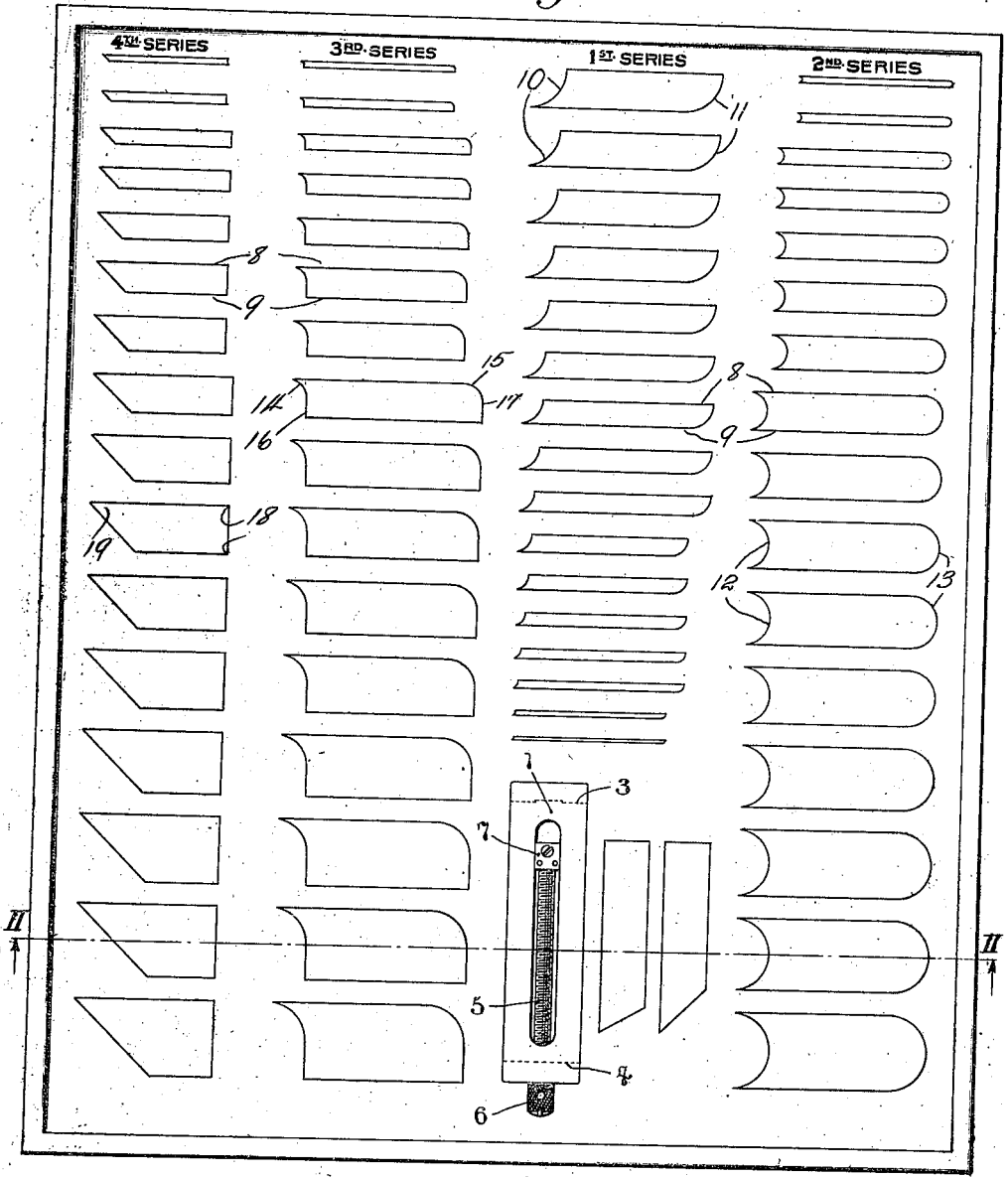
Fig. II.
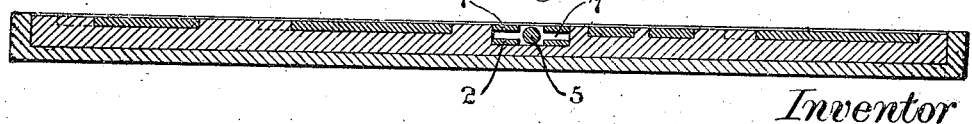
Inventor
Carl Edvard Johansson
by attorneys C. E. JOHANSSON.
MEASURING SET.
APPLICATION FILED NOV. 19, 1919.
1,435,525.
Patented Nov. 14, 1922.
2 SHEETS—SHEET 2.
Fig. III. Fig. IV. Fig. V.   Fig. VI.   Fig. VII. Fig. VIII.
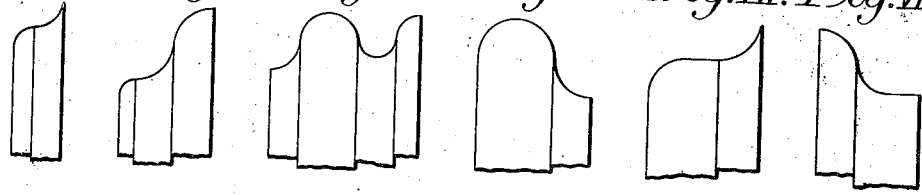
Fig. IX.   Fig. X.   Fig. XI.   Fig. XII. Fig. XIII.
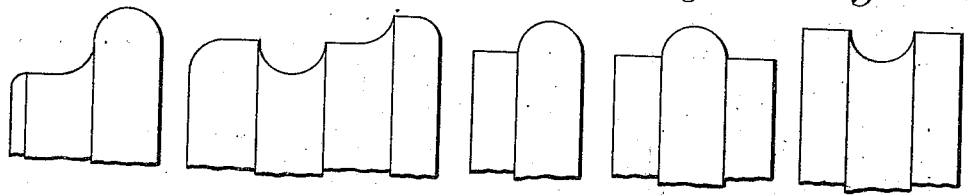
Fig. XIV.   Fig. XV.   Fig. XVI.
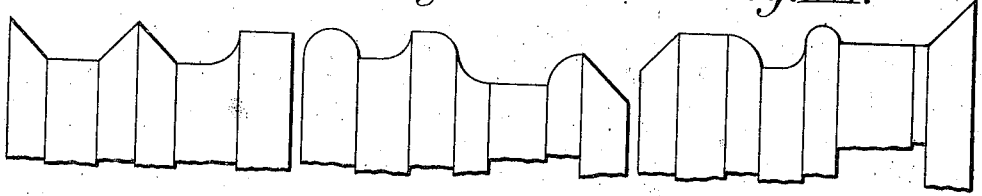
Fig. XVII. Fig. XVIII.   Fig. XIX.   Fig. XX.
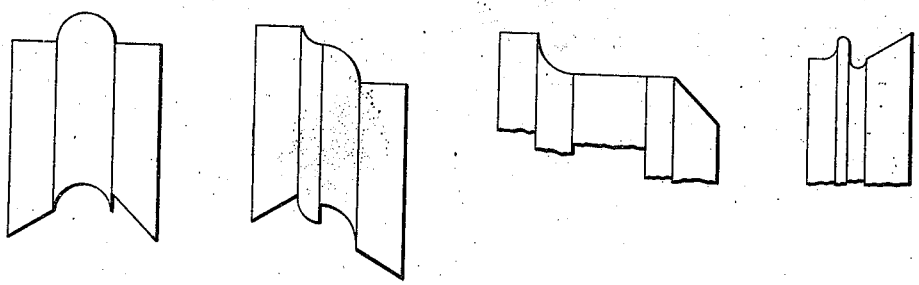
Fig. XXI.   Fig. XXII.
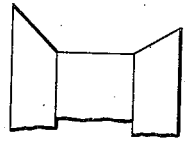 
Inventor
Carl Edvard Johansson
by attorneys Patented Nov. 14, 1922.

1,435,525

UNITED STATES PATENT OFFICE.

CARL EDVARD JOHANSSON, OF ESKILSTUNA, SWEDEN.

MEASURING SET.

Application filed November 19, 1919. Serial No. 339,235.

*To all whom it may concern:*

Be it known that I, CARL EDVARD JOHANSSON, subject of the Crown of Sweden, and resident of Eskilstuna, Sweden, have invented a new and useful Measuring Set, of which the following is a specification.

Beside the need for accurate size measurements and accurate angular measurements there exists in the mechanical industry a need for an accurate and convenient means of checking, determining, or controlling the relation of certain surfaces in the form of circles, part circles, tangents to circles, angles, and plane surfaces, forming the contour of a work piece.

At the present time the method of measuring and controlling contours is to make up a special radius gage or templet for each such contour. The making of such special test pieces is very expensive and results in the waste of much time and material. My present invention is intended to eliminate the expense and inconvenience of making up such templets by providing sets of measuring pieces each having two accurately plane and parallel sides of a known distance apart and each having a certain predetermined contour so formed that by combining two or more of said measuring pieces a considerably greater number of different contour measures or controls can be made up than would be possible by using any one of the different pieces.

In the accompanying drawings:

Fig. I represents in top plan a box containing several sets of measuring pieces, two separate individual measuring pieces, and a suitable holder.

Fig. II represents the same in cross section, taken in the plane of the line II—II of Fig. I.

Figs. III–XXII inclusive represent a number of combinations which may be obtained by the association of certain of the measuring pieces of the different series.

The measuring set consists of one or more series of measuring pieces, each piece being finished with two accurately plane and parallel sides as shown at 8 and 9, one or both ends of each measuring piece being finished to form a curve, an angle, or a curve and a plane surface tangent thereto in certain relation to the parallel sides of each piece. The measuring pieces in each series have a certain predetermined width between the parallel sides 8 and 9, each piece in the series increasing in width by convenient steps, for example, a series of sixteen of these measuring pieces could be graduated in size from $\frac{1}{16}''$ to $1''$ in width.

A few examples follow:

Each piece may be formed at one or both ends into a quarter circle (concave or convex) as shown at 10 and 11, the radius of each being equal to the width of the measuring piece, as illustrated in Fig. I by the 1st series.

Each piece may be formed at one or both ends into a semi-circle (concave or convex) as shown at 12 and 13 with a radius equal to one half the width of the measuring piece, as illustrated in Fig. I by the 2nd series.

Each piece may be formed at one or both ends with a quarter circle (concave or convex) as shown at 14 or 15 having a radius equal to one-half of the width of the gage, and a plane face as shown at 16 or 17 tangent to said quarter circle and forming a right angle with one of the sides of the measuring piece as illustrated in Fig. I by the 3rd series.

For the further development of this system of measuring or controlling contours an additional series of measuring pieces may be provided with the ends of each piece finished at any desired angle in relation to the parallel sides of the measuring piece.

For instance, each piece may have one end finished to form a right angle as shown at 18 with the parallel sides 8 and 9 of the piece and the other end shaped to form an angle of 45° as shown at 19 with one of the parallel sides of the piece, as illustrated in Fig. I, 4th series.

One or more series of measuring pieces formed as above described when used in combination make possible the accurate formation of a great variety of contours; for example, by selecting two or more pieces from the 1st series of a width giving the desired radius of the contour to be formed and by combining said pieces so that, for instance, convex and concave sides are tangent to each other, one obtains a profile as illustrated in Figures III and IV. By combining pieces from the 1st and 2nd series one can obtain profiles as shown in Figs. V and VI. By combining pieces from the 1st and 3rd series one can obtain profiles as illustrated in Figs. VII and VIII. By combining pieces from the 1st, 2nd and 3rd series one can obtain a profile as illustrated in Fig. IX.

By combining pieces from the 2nd and 3rd series one can obtain a profile as illustrated in Fig. X. By combining pieces from the 2nd and 4th series one can obtain profiles as shown in Figures XI, XII and XIII. By combining pieces from the 3rd and 4th series one can obtain a profile as illustrated in Fig. XIV. By combining pieces from the 1st, 2nd, 3rd and 4th series one can obtain a profile as shown in Figure XV. It is also possible to use said pieces in combination with regular standard gage measures and angular pieces from the angle set previously referred to. By using such combination one can obtain profiles as shown in Fig. XVI. Figures XVII, XVIII, XIX, XXI and XXII are further examples of the variations in profile possible by different combinations of pieces.

In order to retain the pieces placed together in proper position, a holder of any form suitable for the purpose may be used. This holder may be as shown at Figs. I and II comprising side members 1 and 2 and the end members 3 and 4 which serves to hold the side members spaced apart a sufficient width to receive the measuring pieces. A screw 5 operates through one end of the holder movable towards and away from the opposite end of the holder. The outer end of this screw may be provided with a head 6, and the inner end of the screw is rotatably mounted in a follower 7.

It is obvious that various changes can be made in the construction of the measuring pieces above described, such as changes in thickness, a greater or lesser increment of increase in size between the pieces of each series and an infinite variety of different forms provided such as commonly met with in mechanical work; hence I do not wish to limit myself to the particular forms, series or structures above described, but—

What I claim is:

1. In a measuring set for measuring or controlling contours, a plurality of separate measuring pieces, each piece having two plane and parallel sides a predetermined distance apart and an end of each of said pieces forming a certain predetermined contour in relation to said parallel sides, the contour of each piece being different from that of the others, so that by placing the sides of two or more of said pieces together a greater number of different contours can be formed than may be obtained with the separate pieces.

2. In a measuring set for measuring or controlling contours, a plurality of separate measuring pieces, each piece having two plane and parallel sides a predetermined distance apart and both ends of each of said pieces forming certain predetermined contours in relation to said parallel sides, the contour of each piece being different from that of the others, so that by placing two or more of said pieces together a greater number of different contours can be formed than may be obtained with the separate pieces.

3. In a measuring set for measuring or controlling contours, a plurality of separate measuring pieces, each piece having two plane and parallel sides a predetermined distance apart and the pieces of the set progressively increasing in width, an end of each of said pieces forming a certain predetermined contour in relation to the parallel sides and width of the piece, the contour of each piece being different from that of the others, so that by placing the sides of two or more of said pieces together a greater number of different contours can be formed than may be obtained with the separate pieces.

4. In a measuring set for measuring or controlling contours, a plurality of separate measuring pieces, each piece having two plane and parallel sides, a predetermined distance apart, and the pieces of the set progressively increasing in width, both ends of each of said pieces forming certain predetermined contours in relation to the parallel sides and width of the piece, the contour of each piece being different from that of the others, so that by placing the sides of two or more of said pieces together a greater number of different contours can be formed than may be obtained with the separate pieces.

In testimony, that I claim the foregoing as my invention, I have signed my name, this 13th day of November, nineteen hundred and nineteen.

CARL EDVARD JOHANSSON.